Apr. 10, 1923. 1,451,555
W. SCHENSTROM
ARC WELDED TRUSS
Original Filed Oct. 11, 1920  2 sheets-sheet 1
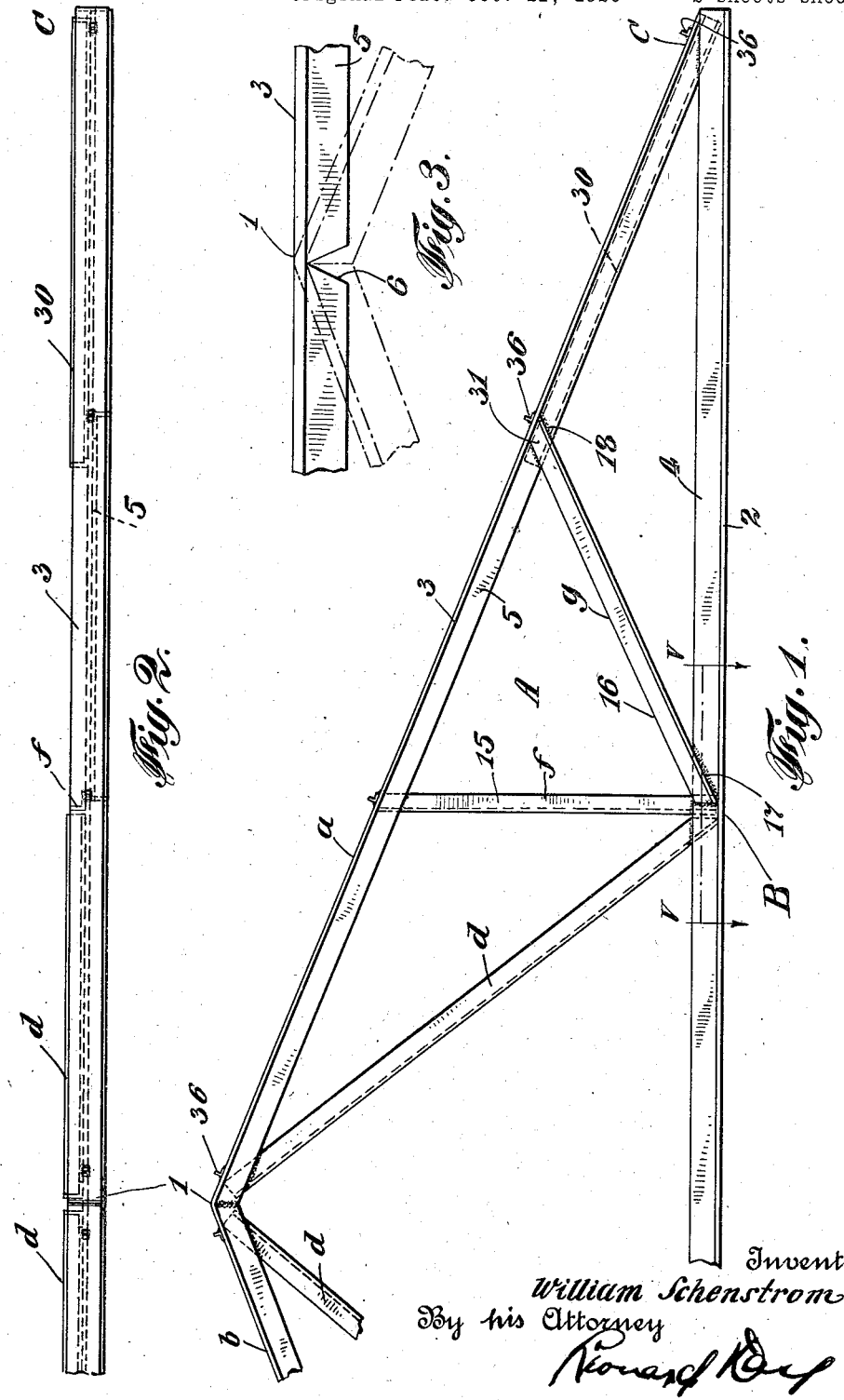
Inventor
William Schenstrom
By his Attorney Apr. 10, 1923.
W. SCHENSTROM
ARC WELDED TRUSS
Original Filed Oct. 11, 1920
1,451,555
2 sheets-sheet 2
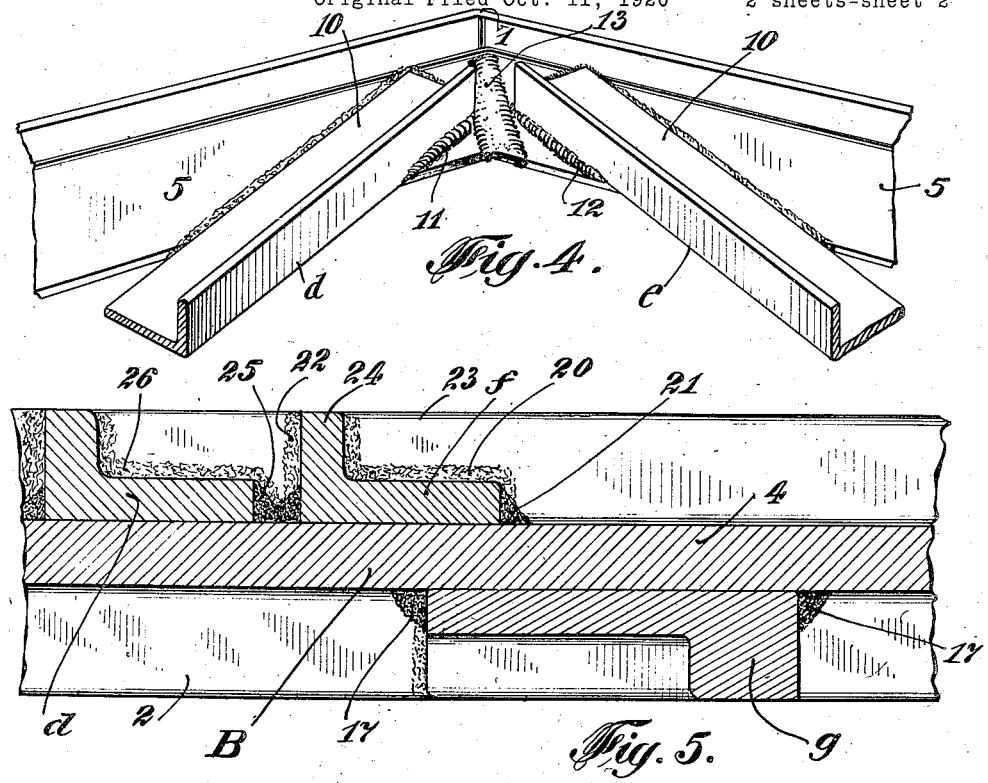
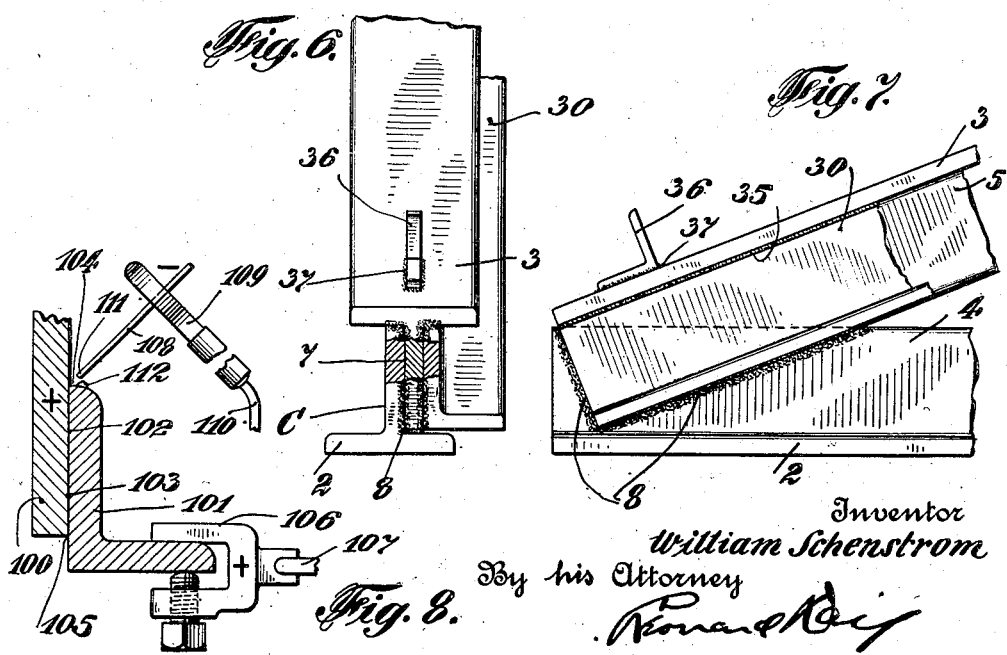
Inventor
William Schenstrom
By his Attorney Patented Apr. 10, 1923.

1,451,555

UNITED STATES PATENT OFFICE.

WILLIAM SCHENSTROM, OF BROOKLYN, NEW YORK.

ARC-WELDED TRUSS.

Application filed October 11, 1920, Serial No. 416,011. Renewed November 4, 1922. Serial No. 599,160.

*To all whom it may concern:*

Be it known that I, WILLIAM SCHENSTROM, a citizen of the United States, and a resident of Brooklyn, county of Kings, State of New York, have invented certain new and useful Improvements in Arc-Welded Trusses, set forth in the following specification.

This invention relates to framed beam construction or building construction in which beams and other structural steel parts are joined one to another. The object of the invention is to improve in general both the method of joining beams and the finished joint between beams, to the end that the method of joining effect a saving both as to the time employed, the cost of material, and the elimination of inconvenience due to the process employed.

In general, the improvements in the finished joint reside in making possible the employment of beams for the fabrication of a structural frame-work, each of which may be chosen of a size just sufficient to meet the stresses which are to be resisted, without any allowance being necessary for weakness at a joint. In other words, it is an object of the invention to effect a finished joint in framed beam construction in which the joint, without the addition of reinforcing parts, is as strong or stronger than any other portion of the structure.

Heretofore in building construction it has been customary to join beams by means of rivets passing through rivet holes at the locality to be joined. Obviously the provision of rivet holes has reduced the effective cross section of the beams at their locality and, in consequence, has impaired the total strength of the beam employed, particularly its strength in tension so that, as a consequence, the design of such a structure required the employment of beams sufficiently strong at the weakest locality, namely, the riveted joint, to resist stresses for which it was designed, while the main portions of the beam, where there were no joints, naturally were of excessive strength for the purpose contemplated. This disadvantage in design of building construction in which riveted joints were employed caused a very considerable increase in the cost. In addition, the disadvantage of the noise attendant upon riveting operations is well-known and of not a little consideration in its limiting effect upon the hours during which operations may be permitted on account of the character of the nuisance.

Some attempts have been made to weld beams and other framed parts but without due regard to the qualities upon which the real strength of structural steel depends. In the building art, hard rolled steel in the form of a beam is standard construction stock. A large percentage of the strength of this material is dependent upon both the state and the chemical composition of the beam. Ordinarily, that is, by ordinary methods used heretofore, the process of welding one beam to another requires the heating of a considerable portion of the beam to a welding temperature and subjecting it and the part to which it is to be welded, likewise heated to a welding temperature, to sufficient pressure to bring the parts into molecular contact. This necessary heating changes both the state and the chemical composition of the steel beam at the locality of the weld. The heating itself is sufficient to anneal the beam or, in other words, to destroy that hardness resembling temper imparted to a beam by the rolling operation in a mill.

The ordinary weld likewise is apt to change the chemical character of the steel by eliminating a percentage of the carbon content. This likewise produces a point of weakness. Thus it should be understood that previous methods of joining beams, either by riveting or welding had the drawback of a point of weakness at the joint, so that either specially reinforced joints were required in order to obtain the full use of the cross section of the beam proper, or the designing of the structure was perforce limited to the relatively smaller strength at the joint when no special reinforce at the joint was employed.

This application is directed to two inventions,—first, the generically new article of manufacture, namely, two or more framed beams in which each beam has uniform cross section throughout, is of uniform chemical composition and state throughout, and is of hard rolled steel, and provided with a simple joint between contacting surfaces of strength coequal with the beams themselves. The application is likewise directed to a more specific application of this generic invention, namely, a novel truss construction.

In carrying out the invention, the unchanged character of hard rolled steel beams is maintained, while at the same time a satisfactory durable and easily fabricated joint is provided by the use of the electric arc weld in such a manner that no alteration in the chemical composition of the steel can take place.

In furthering this object, the negative electrode of an electric circuit in the form of a spelter pencil is employed in a suitable holder, while the beams to be welded form the positive electrode. The spelter is employed locally to strike an arc at the edge of the surface contacting portions of the beams to be joined. The actual locality of the arc is raised to an intense temperature, but only locally. The spelter electrode melts and, following the laws of electrolysis, is caused to flow directly against the work to be joined. The spelter, as it flows, is molten, whereas the surfaces to be joined, although approximating the melting temperature at their exact surfaces, are practically cold immediately below the surface. The local surface heating, due to the intense arc, is sufficient to cause the inflowing spelter to form a molecular union which completes, as the process is continued from spot to spot, a strong joint without altering the state or chemical composition of the beams themselves. In fact, the beams are strengthened at the locality of the joint by the amount of the spelter applied. The spelter may be of soft iron or any of the usual iron alloys used in the art of electric arc welding.

The objects of the invention will be set forth more particularly in the accompanying claims, which are directed merely for the purposes of illustration to the illustrative embodiment of the invention described in the following specification in connection with the accompanying drawings, which form a part hereof, and in which like characters designate corresponding parts in the several figures. In the drawings—

Fig. 1 is a fragmentary side elevation showing one half of the roof truss complete;

Fig. 2 is a plan view of the structure shown in Fig. 1;

Fig. 3 is a detail of the peak formation of the truss of Figs. 1 and 2;

Fig. 4 is a perspective view of the finished peak construction of the truss, but drawn to an enlarged scale;

Fig. 5 is a section taken along line V—V of Fig. 1 and looking downwardly in the direction of the arrows;

Fig. 6 is an end view drawn to an enlarged scale of the joint between the top and bottom chords, but with a section broken away and the web shown in section for the purpose of better illustrating the close contact between the webs;

Fig. 7 is a side elevation of the end joint illustrated in Fig. 6; and

Fig. 8 is a sectional view, partly in diagram, showing the method of forming the joints in accordance with the invention.

In practicing the invention, any two beams indicated for illustration in Fig. 8 by 100 and 101, are positioned relatively as may be desired for the finished framed structure, but of necessity so that a portion 102 of the beam 100 mutually contacts with a portion 103 of the beam 101. Along the edges 104, 105, et cetera, of the mutually contacting surfaces 102 and 103 is formed an electric arc weld. At this point it should be understood that this expression "an electric arc weld" is intended to include either a complete welded ridge which extends around the entire encircling edge bounding the mutually contacting surfaces, or a weld which involves only a portion of such edge, or a plurality of welds, each covering an extent, more or less, of the said edge.

A suitable clamp, the positive terminal of a suitable welding circuit 107, is clamped to one or both of the beams 100 and 101, which are suitably temporarily held together, as indicated in Fig. 8, while the negative electrode 108, in the form of a spelter pencil of the desired chemical composition, carried by a holder 109, extending from the negative circuit.

110, is serviceable for application directly to the locality of the joint. The arc is formed between the spelter tip 111 and the edge 104. In carrying out this process, the manipulation is such that not more than a spot of about one eighth of an inch in diameter at a time on the beam is surface-heated to any appreciable extent. Such a spot, however, is of sufficient extent to effect a molecular union with a drop of spelter 112. These drops or splotches of spelter may be applied one over the other until a ridge or joint of sufficient extent along the edge 104 is built up.

The better to illustrate the more or less complex complete structure framed in accordance with the present invention, there is described below the complete construction of a light truss suitable for shed roofs and the like, and one in which the full strength of the beams employed is utilized throughout the entire truss.

The truss A illustrated comprises two integral portions $a$ and $b$ symmetrical about the vertical plane extending through the peak 1. The bottom chord 2 and the top chord 3 are formed preferably of T-irons with their webs 4 and 5 vertical. In forming the truss a gusset piece is first removed from the web 5 of the top chord 3 for the location of the peak 1, so that a triangular notch 6 of the desired angularity to permit the edges of the notch 6 to contact when the top chord 3 is bent, as indicated in dot and dash lines in Fig. 3, to form the desired slope for the truss. After the top chord 3 is bent as described, the ends of the top and bottom chords are secured to each other, as is specifically illustrated for the end C.

The webs 4 and 5 are brought and clamped into close contact, as indicated by the meeting line 7 in Fig. 6. The electric arc weld 8 is formed along every terminal edge of the surfaces of webs 4 and 5 which are in contact at the end C. In the forming of such a weld no weakening of the joint occurs. In fact, additional metal such as iron is employed to form the weld.

The formation of end joints between the top and bottom chords gives the final shape to the truss, during which process a templet may be employed, if desired. After the ends C are joined, the braces may be applied. In the truss illustrated, one brace $d$ in the form of an angle has its web 10 in direct contact with the web 5 of the top chord A at the locality of the peak 1. An electric arc weld 11 closes every terminal edge of the surfaces of the webs 10 and 5 in contact, so that the space therebetween is hermetically sealed. A symmetrical brace $e$ has its web 10 directly applied to the web 5 on the opposite side of the peak and is similarly secured by an electric arc weld 12. The edges of the triangular notch 6 are also secured by an electric arc weld 13. In this manner the peak joint is completely fabricated without the use of a gusset plate and without in any way weakening the normal strength of the top chord or the braces. A second vertical brace $f$ for each half of the truss is secured at its ends preferably in vertical position near the locality of the bottom end of brace $d$, so that its web 15 directly contacts with the webs 4 and 5 of the bottom and top chords 2 and 3. It is preferred, although not necessary, that this brace $f$ be located at the same side of the webs 4 and 5 as is the brace $d$.

A counter brace $g$ for each half of the truss is preferably provided of suitable angle stock. Its web 16 at its ends is joined directly to the webs 4 and 5 of the top and bottom chords but preferably on the opposite sides of these webs from the braces $d$ and $f$. Electric arc welds 17 and 18 completely cover the meeting edges of the mutually contacting space between the webs at the ends of this brace $g$.

In Fig. 5 the sectional illustration well illustrates the joint B of the braces $d$, $f$ and $g$ with the bottom chord 2. The electric arc weld 20 of the brace $f$ is shown in this instance not only with a portion 21 covering the meeting edge of the contacting webs but also with a portion 22 covering the edges of the meeting portions of the flanges 23 and 24. This is likewise true of the electric weld 25 for the brace $l$ which has a portion 26 covering the meeting edges between the flanges 23 and 24.

It has been found desirable to reinforce the top chord near its ends and it is preferred that this be accomplished by the direct application to the web 5 of the top chord of an angle 30 extending from the joint 31 of the brace $g$ to the end joint C. This reinforcing angle is directly secured to the top chord A with its web and that of the top chord in direct contact by a suitable electric arc weld 35, which preferably is of an extent completely to conceal the entire contacting surfaces between the meeting webs.

At desired intervals along the top chord 3 are secured angles 36 which are preferably attached by an electric arc weld 37. These angles 36 serve as anchorages for the purlins.

Although the truss structure illustrated and described is shown as comprising beams in form of either T-irons or angles, it is to be understood that the beams employed are by no means limited to these shapes, and the expression "webbed-beams" is employed to designate generically any usual structural beam including T-irons, angles, channel-irons, etc.

What I claim and desire to secure by Letters Patent is:—

1. In building construction, a plurality of beams, each throughout its entire extent of uniform cross section, substantially the same chemical composition and in substantially the same state, of unannealed steel having a hardness in the nature of temper; portions of two or more of said beams having mutual surface-contacting portions; and an electric arc weld joining said two or more beams along the edge of said surface-contacting portions.

2. A joint for structural and other members of ferrous metal having a hardness in the nature of temper, comprising two mutually surface contacting lapped portions; a series of overlapping electric arc welds spanning the exposed parting edge between said lapped portions, with substantially the entire cross-section of said members maintained in its initial hardness.

3. A joint for structural and other members of ferrous metal having a hardness in the nature of temper, comprising two mutually surface contacting lapped portions; a series of overlapping electric arc welds spanning the exposed parting edge between said lapped portions, covering said edge in its entire extent and hermetically sealing off said lapped portions, with substantially the entire cross-section of said members maintained in its initial hardness and whereby said joint is protected against the entrance of moisture and its bursting action upon freezing.

4. The process of framing beams of hard rolled steel comprising temporarily clamping two flat portions of beams one to the other; maintaining the entire beams substantially cold; applying intense heat to a restricted area at the edge of the mutually contacting portions of said beams; and electrolytically causing molten ferrous metal to flow upon the said locally heated spot.

5. The process of joining structural and other members of ferrous metal having a hardness in the nature of temper, comprising temporarily holding two mutually contactable portions lapped together; maintaining the entire said members substantially cold; locally applying the intense heat of an electric arc to restricted spots one at a time about the exposed parting edge of said portions lapped together; electrolytically causing molten ferrous metal to flow upon each said locally heated spot, one at a time, whereby a strength increasing joint is fabricated without drawing or heat-altering the inherent hardness of said members.

6. A truss comprising a bottom chord and a top chord of webbed-beams with the webs at the ends of both said chords in direct contact and mutually secured by an electric arc weld; and braces of webbed-beams having the webs at their opposite ends directly connected by electric arc welds to the respective webs of said bottom and top chords.

7. A truss comprising a bottom chord and an arched top chord of webbed-beams with the webs at the ends of both said chords in direct contact and mutually secured by an electrical arc weld completely enclosing the contacting surfaces; and braces of webbed-beams having the webs at their opposite ends directly connected by electrical welds to the respective webs of said bottom and top chords.

8. A truss comprising a top chord of webbed-beam construction having a V-shaped piece removed at the peak and being bent so that the edges at the removed portion contact; braces or struts of webbed-beam construction having their webs directly contacting with the web of said top chord near the locality where said V-shaped piece was removed; and arc welds extending along every terminal edge of the area in contact between said contacting webs so that the space between contacting webs is hermetically closed and a permanent, secure mechanical joint is provided.

In witness whereof I have signed my name to this specification, this 23rd day of September, 1920.

WILLIAM SCHENSTROM.